UNITED STATES PATENT OFFICE.

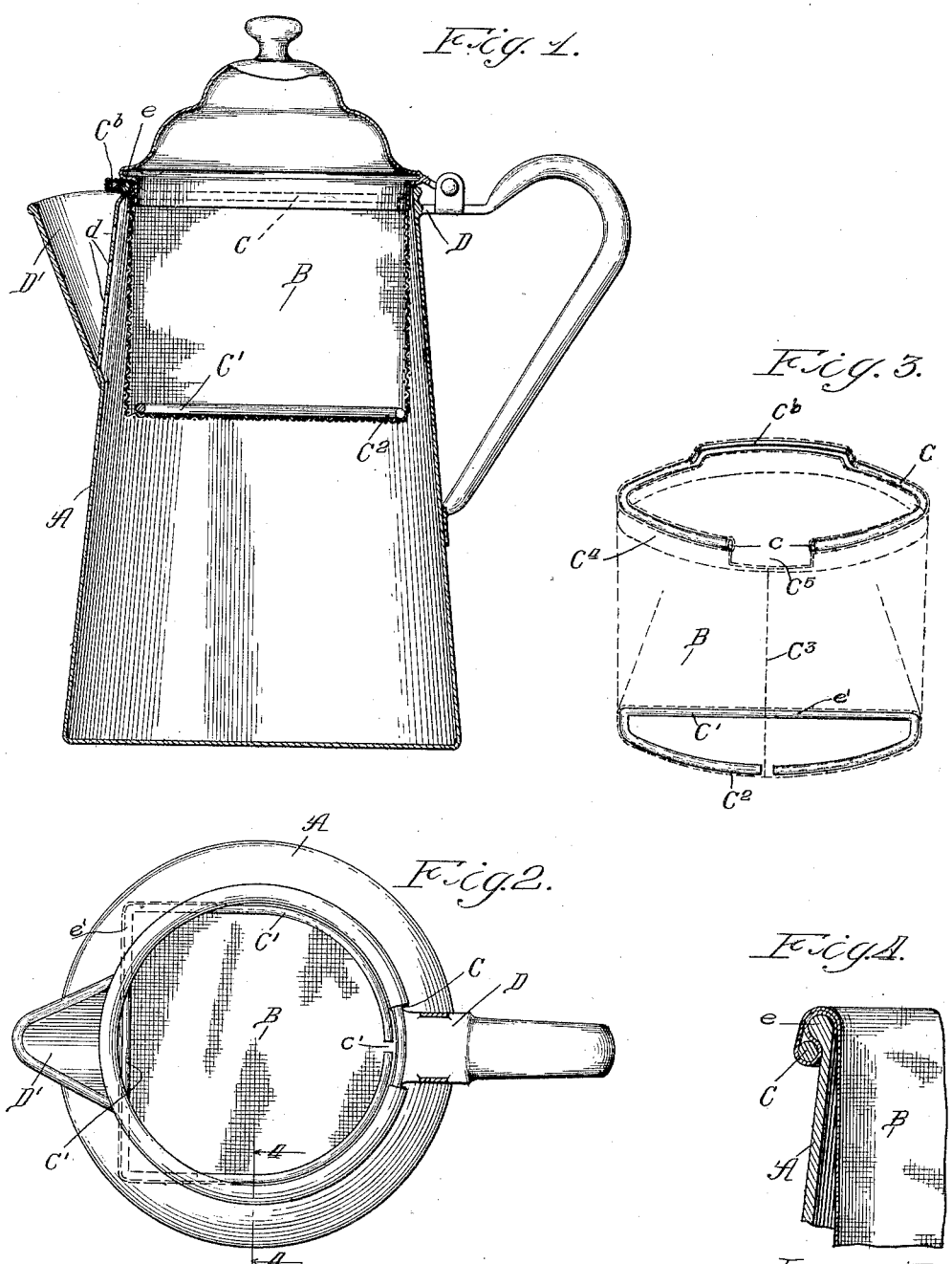

EDDIE O. HIGDON, OF CHICAGO, ILLINOIS.

LIQUID-PERCOLATOR.

1,098,799.  Specification of Letters Patent.  Patented June 2, 1914.

Application filed March 17, 1913. Serial No. 754,714.

*To all whom it may concern:*

Be it known that I, EDDIE O. HIGDON, a citizen of the United States, residing at Chicago, Illinois, have invented certain new and useful Improvements in Liquid-Percolators, of which the following, taken in connection with the drawing, is a description.

My invention has for its object the production of a liquid percolating device which is designed to be used on coffee and teapots, or the like, of any size or style now manufactured.

My improvement consists in a construction and arrangement of a device to be used in preparing beverages by pouring liquid over the ingredients from which the beverage is made, which are contained in a receptacle, so as to allow the liquid to percolate through said ingredients and drop into the lower part of the coffeepot, or receptacle.

Another object of my invention is to devise a filtering device which shall be provided with means for spreading the bottom of the bag and maintaining a flat surface upon which the ingredients are placed and preventing them from settling together in the bottom of a rounded bag, as is the case with filtering bags having no spreading device.

These and other features of construction and advantage will more fully appear in the following description of the same.

In the accompanying drawings, I have illustrated what I now consider the preferred form of my invention as applied to an ordinary coffee pot and in these drawings Figure 1 is a sectional view through a coffee pot illustrating my invention applied therein; Fig. 2 is a top plan view of the same with the cover of the coffee pot removed; Fig. 3 is a perspective view of the percolator removed from the receptacle or coffee pot, and Fig. 4 is an enlarged sectional detail illustrating the method of attaching the percolator over the rim of the coffee pot.

In the drawings A represents a coffee pot of well known construction and of a type which can be purchased in any store handling such articles.

I am aware that cloth bags of various kinds have been heretofore used for filtering purposes, but such devices have necessitated a specially constructed receptacle adapted for that specific device, which made the article so expensive as to prohibit its use in many cases.

My percolating device comprises a cloth bag B, which is preferably, although not necessarily, formed of a single piece of material, and two metallic rings C, C'. Each of these rings is open as shown at $c$ $c'$ for a purpose hereinafter explained.

The bag B is formed by folding a single piece of cloth and stitching along the seams $c^2$, $c^3$ to form the shape desired for this receptacle, which is clearly shown in Figs. 1, 2 and 3. The bag is hemmed, $c^4$, around the top edge thereof from each side of the opening $c^5$. The ring C is disposed inside of this hem and encircles the top of the bag to the opening or recess $c^5$ which is cut out of the cloth forming the bag as shown in Fig. 3 for the purpose of receiving the handle D of the coffee pot.

The ring C as will be observed in Fig. 3 is provided with a raised portion $c^b$ at a point directly opposite the opening $c^5$ in the ring, for the purpose of taking over the spout D of the coffee pot when the percolating device is secured thereto. This ring C is made of a size slightly smaller than the rim of the pot which it is to fit. When to be used, the ring is spread open sufficiently to allow it to be stretched over the top of the pot and turned down over the body or rim $e$, which forms the top rim of the receptacle. By this means the percolator is easily and quickly attached to the pot, and as easily and quickly removed therefrom when desired. In the bottom of this bag I provide a spreader ring C', the shape of which is straight on one side and circular on the other. This ring also has an opening on one side thereof as heretofore explained, for the purpose of adjustment, and in use this opening of the spreader ring C' is turned toward the handle of the receptacle, leaving the straight edge $e'$ toward the spout side of the pot which serves the purpose of holding the bag far enough away from the openings $d$ to the spout to permit easy and free pouring of the liquid, without returning it through the dregs, thereby leaving the liquid clear and free of all sediment. This spreader ring C' also maintains the bottom of the bag in a flat, level and even surface, over which the coffee grounds are more evenly spread, permitting a more even flow of the liquid through them, and preventing the grounds from forming into a ball at the bottom of the bag. It will be observed that by this larger surface at the bottom of the bag it is possible to spread the ingredients over a larger surface and thereby more readily extract all of the strength of the ingredients much more quickly and evenly, with the result that the beverage retains all of the aroma and flavor.

By forming the spreader of the shapes described it is easy to place it in position in the bag by dropping it endwise into position after the ring C has been clamped over the rim $e$. The top of the pot being of smaller diameter, it is possible with the spreader ring in the bottom of the bag to turn the pot upside down to remove the grounds and the spreader ring will remain in position. The ring is easily removed at any time by turning it sidewise. The straight edge of the spreader is placed on the side of the spout of the vessel, and when the bag is wet it tends to cling to the inner walls of the pot when it is standing in an upright position thereby closing the holes $d$ opening to the spout during the process of percolation thereby retaining the steam and aroma therein. When the pot is turned to one side for pouring, the liquid will displace the cloth from the side wall of the coffee pot.

I claim:—

1. A percolating device for coffee pots and the like, comprising a cloth bag formed of a single piece of material, an open spring ring arranged in the top edge of said bag and adapted to clamp over the top edge of the pot and maintain said percolator in position, a removable spreader in the bottom of said bag, said spreader being straight on one edge thereof, substantially as described.

2. A percolating device comprising a cloth bag formed of a single piece of material having a hem in the upper edge with a recess in one side thereof, an open ring arranged in said hem, said ring having a raised portion on the side opposite the opening in the ring, a spreader in the bottom of said bag, one side of said spreader being straight, the opposite side circular, substantially as described.

In testimony whereof I have signed this specification in the presence of two subscribing witnesses.

EDDIE O. HIGDON.

Witnesses:
DANIEL W. HEFFRON,
JOHN MITCHELL.

---

Copies of this patent may be obtained for five cents each, by addressing the "Commissioner of Patents, Washington, D. C."